United States Patent
Wang et al.

(10) Patent No.: US 12,493,656 B2
(45) Date of Patent: Dec. 9, 2025

(54) GEO-BASED VECTOR DATA AND RASTER DATA JOINING AND/OR AGGREGATION USING USER DEFINED FUNCTION(S)

(71) Applicant: Deere & Company, Moline, IL (US)

(72) Inventors: Nanzhu Wang, Kirkland, WA (US); Zhiqiang Yuan, San Jose, CA (US); Sai Cheemalapati, Bellevue, WA (US)

(73) Assignee: Deere & Company, Moline, IL (US)

( * ) Notice: Subject to any disclaimer, the term of this patent is extended or adjusted under 35 U.S.C. 154(b) by 192 days.

(21) Appl. No.: 17/978,453

(22) Filed: Nov. 1, 2022

(65) Prior Publication Data

US 2024/0143667 A1     May 2, 2024

(51) Int. Cl.
  *G06F 16/908*     (2019.01)
  *G06F 16/901*     (2019.01)
  *G06F 16/909*     (2019.01)
  *G06V 20/10*      (2022.01)

(52) U.S. Cl.
  CPC ........ *G06F 16/908* (2019.01); *G06F 16/9024* (2019.01); *G06F 16/909* (2019.01); *G06V 20/188* (2022.01)

(58) Field of Classification Search
  None
  See application file for complete search history.

(56) References Cited

U.S. PATENT DOCUMENTS

| | | | | |
|---|---|---|---|---|
| 2018/0070527 A1* | 3/2018 | Richt | ................... | A01B 79/005 |
| 2020/0401883 A1* | 12/2020 | Yang | ................... | G05D 1/0033 |
| 2021/0166019 A1* | 6/2021 | White | ................... | G01S 17/89 |
| 2021/0337723 A1* | 11/2021 | Mcmahan | .............. | G05D 1/101 |
| 2022/0078963 A1* | 3/2022 | White | ................... | A01C 7/205 |
| 2024/0094735 A1* | 3/2024 | Wang | ................... | A01B 79/005 |

OTHER PUBLICATIONS

Zhu et al., "Data Compression for Network GIS" 6 pages.
Chen et al., "Comparison of Vector Data Compression Algorithms in Mobile GIS" School of Information Science & Technology. 5 pages.
Stephan Winter "Bridging Vector and Raster Representation in GIS" Department of Geoinformation. 6 pages.
Silva-Coira et al., "Efficient processing of raster and vector data" Plos One 15(1): e0226943. Retrieved from https://doi.org/10.1371/journal.pone.0226943, 35 pages, dated Jan. 10, 2020.
Singla et al., "Raptor Join: In-situ Processing of Big Raster + Vector Data" 12 pages.

* cited by examiner

*Primary Examiner* — Loan T Nguyen
(74) *Attorney, Agent, or Firm* — Hanley, Flight & Zimmerman, LLC

(57) ABSTRACT

Techniques are disclosed herein that enable the generation and processing of user defined functions for customized aggregation and/or joining of instances of agricultural data. Various implementations include agricultural image data which includes one or more high elevation images that capture an agricultural plot. Additional or alternative implementations include transmitting the user defined function to a remote computing device for processing. In some implementations, the user defined function can be processed in tandem with additional user defined functions, where processing of instructions occurring in multiple user defined functions are not repeated.

19 Claims, 7 Drawing Sheets

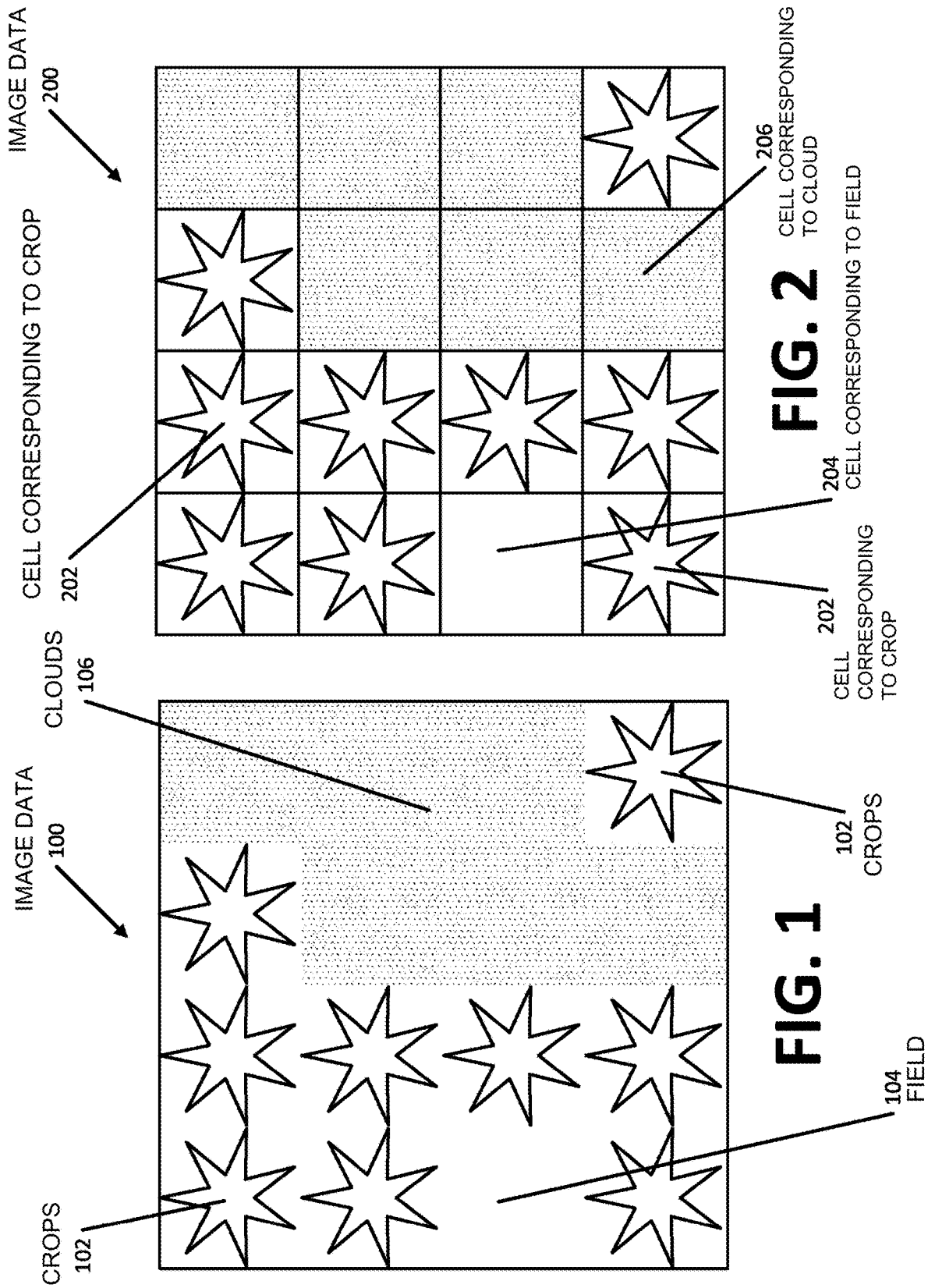

FIG. 4

| | | | |
|---|---|---|---|
| 00 | 00 | 00 | 10 |
| 10 | 00 | 00 | 00 |
| 10 | 10 | 10 | 10 |
| 10 | 10 | 11 | 10 |

CELL VALUES 400

GROUP OF CELLS 402

FIG. 3

| | | | |
|---|---|---|---|
| 00 | 00 | 00 | 10 |
| 10 | 00 | 00 | 00 |
| 10 | 10 | 10 | 10 |
| 10 | 10 | 11 | 10 |

CELL VALUES 300

CELL VALUE CORRESPONDING TO CLOUD 306

CELL VALUE CORRESPONDING TO CROP 302

CELL VALUE CORRESPONDING TO FIELD 304

GEO-BASED VECTOR DATA AND RASTER DATA JOINING AND/OR AGGREGATION USING USER DEFINED FUNCTION(S)

BACKGROUND

As agricultural data mining and planning becomes more commonplace, the amount of data analyzed, and the number of sources providing that data, is increasing rapidly. Agricultural data can be used in a variety of ways including crop yield prediction and/or diagnoses. For instance, image data can be processed using one or more machine learning models to generate agricultural predictions. More accurate agricultural predictions can be made by processing higher quality image data. However, as image quality increases, the computational resource requirement also increases. Consequently, computational resources necessary to store and/or process the image data also increases. Consequently, processing agricultural data for agricultural predictions (e.g., for crop yield predictions) often requires significant data storage and data processing resources.

SUMMARY

Implementations disclosed herein are directed towards processing instances of agricultural data using user defined functions. In some implementations, a given instance of agricultural data can capture a field, where the field can be represented by a two-dimensional set of cells. Each cell can include a value corresponding to a category of agricultural data captured in a portion of the field corresponding to the cell. For example, the instance of agricultural image data can capture a barley field. The barley field can include a first portion growing barley plants and a second unplanted portion (e.g., the second portion is dirt). Cells corresponding to the barley plants can have a first value and cells corresponding to the unplanted field can have a second value.

In some implementations, the system can process the instance of agricultural image data to identify a contiguous group of cells with the same value. For instance, the system can process the image data to identify a contiguous group of cells with the second value indicating an unplanted portion of the field. In some implementations, the system can generate a vector data representation of the contiguous group of cells. A vector data representation of the image data represents the image as a combination of one or more geometric shapes (e.g., point(s), line(s), curve(s), polygon(s), one or more additional or alternative shapes, and/or combinations thereof). For example, the system can generate a vector data representation of the contiguous group of cells with the second value indicating the unplanted portion of the field, where the vector data representation includes a geometric representation of the group of cells along with the category of the group of cells.

In some implementations, an instance of agricultural image data can include one or more portions corresponding to the contiguous group of cells having the same value with the vector data representation of those cells. For example, the system can replace the group of cells indicating the unplanted portion of the field with the vector data representation of the unplanted portion of the field. In some implementations, the vector data representation is a more compact representation of the image data. In other words, by replacing one or more portions of the instance of agricultural image data with vector data representations, the revised instance of image data takes fewer computing resources to store and/or process. For example, the revised instance of image data can take less memory to store compared to the instance of image data. Additionally or alternatively, computing resources to process the vector data portion of the revised instance of image data can be reduced. In some implementations, processing the area captured with the vector data representation can be performed with a single operation, such as by processing the value indicated by the corresponding group of cells. In contrast, to process the equivalent portion of the image data using the raster representation, the system would need to perform one operation for each cell in the contiguous group of cells.

In some implementations, the vector data portion of the agricultural data can be indexed in a data structure, such as an R-tree. R-trees can be used to index multidimensional information such as geographical coordinates, rectangles, polygons, etc. In some implementations, nearby objects can be represented with their minimum bounding rectangle in the next higher level of the tree. A query that does not lie within this bounding rectangle cannot intersect with any of the objects represented by the minimum bounding rectangle. Additionally or alternatively, at the leaf level, each rectangle describes a single object. At subsequently higher levels, the minimum bounding rectangles can include an increasing number of objects. In some implementations, a variety of R-tree data structures can be utilized including a standard R-tree, a Priority R-tree, a R*-tree, a R+ tree, a RR* tree, a Hilbert R-tree, a X-tree, one or more additional R-tree data structures, and/or combinations thereof.

For instance, the vector data representation(s) of an instance of agricultural data can be indexed as an R-tree. For example, each cell in the instance of agricultural data can be represented as an individual node at the leaf level. One or more contiguous cells capturing the same category of agricultural data can be represented in the same bounding rectangle at the next higher level of the tree. Additional contiguous cell(s) and/or group(s) of contiguous cells can be represented in a further bounding rectangle at a further level of the tree.

Additionally or alternatively, a raster data portion of the agricultural data can be indexed as a tile map (also referred to as a tiled web map, slippy tiles, etc.). A tile map can be used to join multiple individually requested image files in a single large image. In some implementations, a user viewing a tile map representation of agricultural data can navigate to nearby areas. For example, a user can pan to agricultural data adjacent to the single large image of agricultural data using arrow buttons. As the user pans to new locations, most of the displayed tiles are still relevant and can be kept displayed while the new tiles are fetched.

In some implementations, a user defined function can direct customized agricultural data aggregation and/or agricultural data joining. For example, a user may define a function that is intended to process the same instance of agricultural data to generate a variety of vegetation indices, where a given vegetation index is a spectral imaging transformation of two or more image bands to enhance the contribution of vegetation properties. This enhancement can enable more reliable spatial and/or temporal comparisons of instances of agricultural data, such as comparisons of photosynthetic activity, canopy structural variations, etc. In some implementations, the enhancement of the agricultural data can be viewed by the user after processing of the agricultural data based on the user defined function. In some of those implementations, the enhanced agricultural data can be rendered for the user via one or more display devices. Additionally or alternatively, the user can manipulate the processed agricultural data such that a subset of the processed agricultural data is rendered (e.g., zoom in on the data, zoom out on the data, pan to the left, pan to the right, pan up, pan down, one or more additional or alternative manipulations, and/or combinations thereof).

Vegetation indices can include a ratio vegetation index, a normalized difference vegetation index, an infrared index, a perpendicular vegetation index, a greenness above bare soil index, a moisture stress index, a leaf water content index, a soil-adjusted vegetation index, a modified soil-adjusted vegetation index, an atmospherically resistant vegetation index, a soil and atmospherically resistant vegetation index, an enhanced vegetation index, a new vegetation index, an aerosol free vegetation index, a triangular vegetation index, a reduced simple ratio index, a visible atmospherically resistant index, a normalized difference built-up index, a weighted difference vegetation index, a fraction of absorbed photosynthetically active radiation index, a normalized difference greenness index, a temperature vegetation water stress index, a discrete-band normalized difference vegetation index, a yellowness index, a photochemical reflectance index, a discrete-band normalized difference water index, a red edge position determination index, a crop chlorophyll content prediction index, a moment distance index, one or more additional or alternative indices, and/or combinations thereof.

In some implementations, a user can generate a user defined function using an application programming interface (API). For example, the user can write code representing instructions for the aggregation and/or joining of the agricultural data using the API. In some implementations, the API and subsequent data processing can be managed by a third party.

In some implementations, a user of a client device can generate a user defined function using a third party application programming interface. The user defined function can indicate customized agricultural data aggregation and/or agricultural data joining. In some implementations, the user defined function can indicate a set of agricultural data to process based on the user defined function. In some of those implementations, the set of agricultural data indicated by the user defined function can be agricultural data uploaded to the third party by the user (and/or an additional user associated with the user). For example, John and Mary can both work for Hypothetical Agricultural Company. Mary can generate a user defined function to process data collected by Hypothetical Agricultural Company, where either Mary or John uploaded the given agricultural data to a third party.

In some other implementations, the set of agricultural data indicated by the user defined function can be uploaded to the third party by an additional user who is not affiliated with the user. For example, Mary can generate a user defined protection to process agriculture uploaded to the third party by Gavin, where Gavin works for AAA Agricultural Company. Additionally or alternatively, a user defined function can indicate data provided to the third company by the user (and/or an associated user) as well as data provided by an additional user not associated with the user. For example, Mary can generate a user defined function to process data she uploaded to the third party, data John (her coworker at Hypothetical Agricultural Company) uploaded to the third party, and data Gavin (the employee of AAA Agricultural Company) uploaded to the third party. For instance, the user defined function can process agricultural data to compare the crop yield of Hypothetical Agricultural Company's fields with the crop yield of the neighboring fields owned by AAA Agricultural Company.

In some implementations, the user defined function can be transferred to a computing system remote from the user (e.g., to a server remote from the client device where the user generated the user defined function via the API). Subsequently, the user defined function can be processed by the computing system to identify a sequence of instructions for processing the agricultural data in accordance with the user defined function. In some of those implementations, the system identified sequence of instructions can be represented by the system as a directed acyclic graph.

Additionally or alternatively, the system can add each of the instructions in the sequence of instructions to an operations queue. The operations queue can process the instructions as batches, in real time (or near real time) as the instructions are added to the queue, based on additional or alternative conditions, and/or combinations thereof.

In some implementations, the system can generate output responsive to the user defined function based on processing the sequence of instructions in the operations queue. In some implementations, the system responsive output can directly include the aggregated and/or joined agricultural data, the result of one or more operations performed on the data, a link to the aggregated and/or joined data stored by the third party (e.g., at the computing device remote from the user), additional or alternative responsive output, and/or combinations thereof. Subsequent to generating the responsive output, the system can transmit the output to the user (e.g., transmit the output from the computing device remote to the user to a computing device local to the user).

Accordingly, various implementations described herein are directed towards generating and processing user defined functions for customized agricultural data aggregation and/or agricultural data joining. In some implementations, instances of agricultural data can be represented using a vector data representation. Computational resources (e.g., memory, processor cycles, power, battery, etc.) may be conserved by updating instances of agricultural image data to include raster data representation(s) and vector data representation(s). For example, representing large groups of cells (e.g., pixels) as a vector, the updated instance of agricultural image data takes less space to store (e.g., less space to store on a hard drive) compared to the instance of agricultural image data. In some implementations, the vector representation can encompass millions of cells. The data necessary to store millions of cells can be significantly reduced by generating a single vector representation to represent those cells.

Similarly, processing the vector representation of the large group of cells in the updated instance of agricultural image data often only requires a single operation performed on the value corresponding to the vector representation. In contrast, processing the corresponding group of cells in the instance of agricultural image data requires processing the value at each cell individually. In some implementations the vector representation can encompass millions of cells. Using a vector representation to perform operations on these portions of agricultural image data can significantly conserve computing resources by greatly reducing the number of operations that need to be performed.

Furthermore, a sequence of instructions can be generated based on a user defined function. In some implementations, multiple user defined functions can be processed by the system at the same time. In some of those implementations, the same instruction (e.g., aggregating and/or joining the same instances of agricultural image data) can be common to two or more user defined functions. Additional or alternative computing resources can be conserved by the system identifying these repeat instructions, and using the output generated based on the given instruction in each of the user defined functions. In contrast, the system would need to repeat the performance of the same operations to perform the given instruction for each of the two or more user defined functions.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 1 illustrates an instance of agricultural image data in accordance with various implementations disclosed herein.

FIG. 2 illustrates an example of partitioning an instance of agricultural image data into cells in accordance with various implementations disclosed herein.

FIG. 3 illustrates an example of an instance of agricultural image data partitioned into cells, where each cell corresponds to a category of agricultural data captured in the cell in accordance with various implementations disclosed herein.

FIG. 4 illustrates an example of a contiguous grouping of cells identified in an instance of agricultural image data in accordance with various implementations disclosed herein.

DETAILED DESCRIPTION

Figure 5:
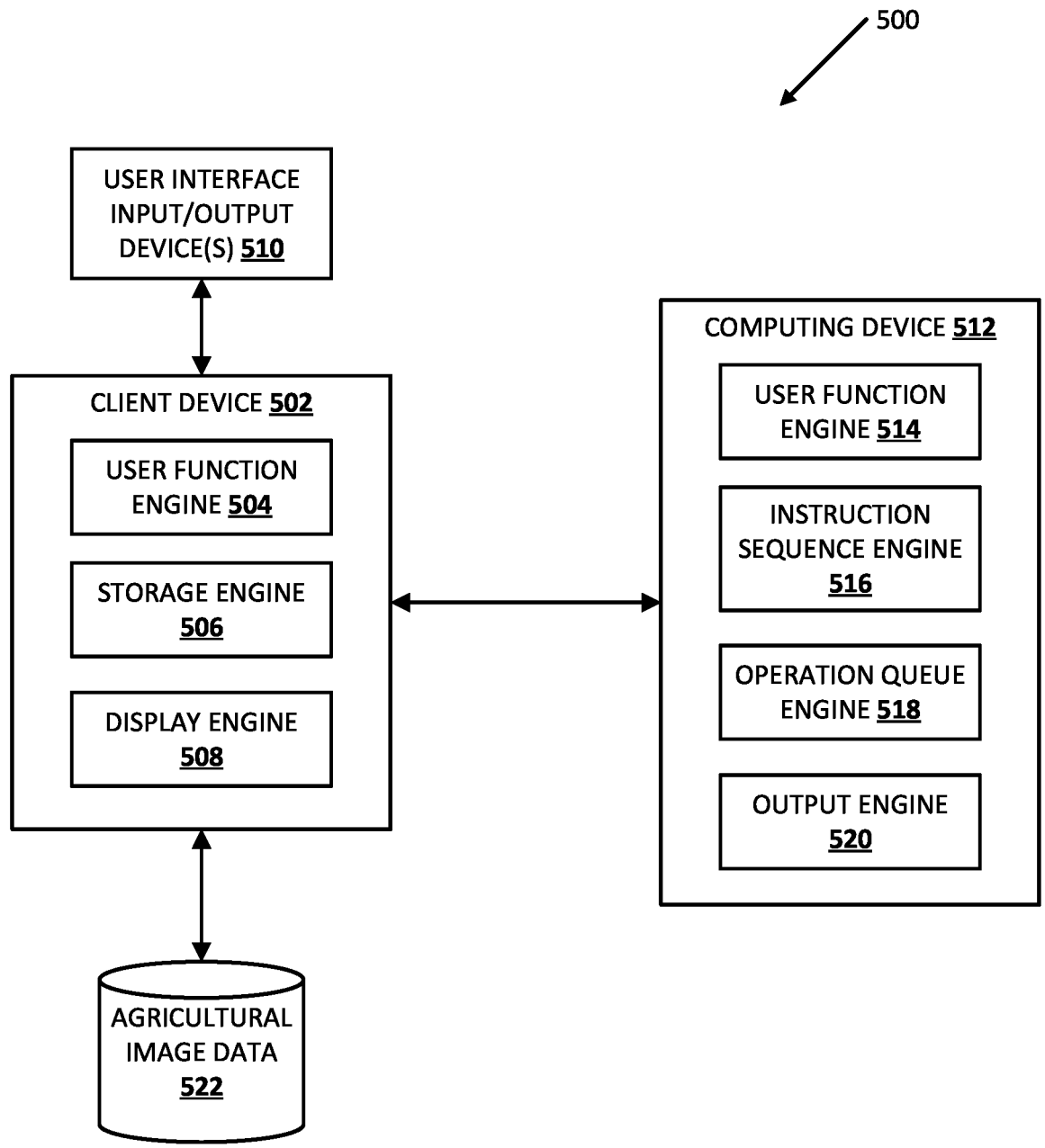
FIG. 5 illustrates an example environment in which various implementations disclosed herein may be implemented.

Turning now to the figures, FIG. 1 illustrates an example instance of agricultural image data. The example instance of image data 100 is image data captured of a farm from overhead. The example instance of image data 100 includes crops 102 (e.g., corn, wheat, tomatoes, barley, cotton, strawberries, spinach, etc.), an unplanted portion of the field 104 (e.g., dirt) and a portion of the instance of image data obscured by cloud(s) 106. In some implementations, the overhead image data can be captured via image sensor(s) affixed to one or more satellites, one or more cube satellite, one or more airplanes, one or more helicopters, one or more unmanned aerial vehicles, one or more additional or alternative objects orbiting earth, one or more additional or alternative aircraft, and/or combinations thereof. In some implementations, the image sensors may include one or more digital cameras, one or more video cameras, one or more thermal imaging sensors, one or more light detection and ranging ("LIDAR") sensors, one or more additional or alternative imaging sensors, and/or combinations thereof.

In some implementations, the instance of agricultural image data can include a variety of additional information such as (but not limited to), the date the image data was captured, the time the image data was captured, the location of the image data, the location of the image sensor(s) when the image data was captured, the altitude of the image sensor(s) when the image data was captured, etc. In some implementations, the location of the image data and/or the location of the image sensor(s) can be captured via a satellite navigation system (e.g., GPS, GLONASS, GALILEO, BeiDou, etc.), can be captured via one or more additional or alternative location sensors, can be determined based on processing the instance of image data, via one or more additional or alternative methods, and/or combinations thereof.

FIG. 2 illustrates an example 200 of the instance of agricultural image data (i.e., the example 100 described in FIG. 1) where the instance of image data has been partitioned into a grid of cells. In the illustrative example 200, the cells are squares, however this is merely illustrative. Cells can include a variety of shapes including (but not limited to) triangles, rectangles, hexagons, etc. In some implementations, individual cells can correspond to individual pixels in the instance of image data, where one cell maps to one pixel, where one cell maps to a group of pixels (e.g., one cell maps to a group of four pixels), etc. Example 200 includes cells 202 corresponding to the crops captured in the instance of image data, a cell 204 corresponding to the unplanted portion of the field captured in the instance of image data, and cells 206 corresponding to the portions of instance of image data blocked by clouds. In the illustrative example, individual crop plants 102 take up an entire cell 202. However, this is merely illustrative. In some implementations, individual crops may take up many cells. In some implementations, the instance of agricultural image data divided into cells 200 can be stored as raster data.

In some implementations, raster data can include a two-dimensional representation of a given field, divided into a plurality of cells. For example, the image data can be represented as a grid of squares. Additionally or alternatively, cells can be of a variety of shapes including (but not limited to) triangles, hexagons, octagons, etc. Each cell can have a corresponding value. For example, the value can indicate a color of one or more pixels corresponding to the cell for rendering the instance of image data. In some implementations, a given cell value can correspond to a category of agriculture captured in the portion of the field corresponding to the given cell.

FIG. 3 includes an example 300 of cell values assigned based on the category of agriculture captured in the portion of the image data corresponding to the given cell. In the illustrative example 300, the cell value '10' 302 corresponds to the cells capturing a crop, the cell value '11' 304 corresponds to the cell which captures the unplanted portion of the field, and the cell value '00' 306 correspond to cells which capture the portions of the field blocked by clouds. Although the agricultural categories represented in FIG. 3 are binary numbers, this is merely illustrative. Additional or alternative representations of values can be used including (but not limited to) Arabic numbers, letters, words, colors, hexadecimal values, etc.

In some implementations, the system can process the cell values to identify one or more contiguous groups of cells with the same value. For example, example 400 of FIG. 4 illustrates a group of cells 402 that share the value '00' corresponding to clouds. In some implementations, the system can partition portion(s) of the image data into image segments, image regions, image objects, etc. by identifying objects and boundaries (lines, curves, edges, corners, etc.) in the image data. For example, the system can identify curves along the edges of the clouds.

In some implementations, the system can identify a candidate group of cells with the same value, and can determine the number of cells within the candidate group. Additionally or alternatively, the system can determine when the number of cells in the candidate group satisfies one or more conditions, such as a threshold value (e.g., the candidate group includes over 10 cells, over 1,000 cells, over 100,000 cells, over 1,000,000 cells, etc.). In some implementations, the system can identify the contiguous group of cells based on the candidate group of cells satisfying a threshold value. In other words, the system will only identify contiguous groups of cells that are sufficiently large.

In some implementations, a contiguous group of cells, such as the contiguous group of cells 402, can be represented using a vector representation. A vector representation of image data can define geometric shapes (e.g., point(s), line(s), curve(s), polygon(s), one or more additional or alternative shapes, and/or combinations thereof). In some implementations, the vector representation can include a geometric representation of the shape of the contiguous group of cells along with the value corresponding to the contiguous group of cells. For example, the vector representation of the contiguous group of cells 402 can include a geometric representation of the shape of the group of cells 402 along with the value '00' corresponding to the group of cells.

FIG. 5 illustrates a block diagram of an example environment 500 in which implementations disclosed herein may be implemented. The example environment 500 includes a client device 502 and computing device 512. Client device 502 can include a client device user function engine 504, a storage engine 506, a display engine 508, and/or one or more additional or alternative client device engines (not depicted). Similarly, computing device 512 can include a computing device user function engine 514, an instruction sequence engine 516, an operation queue engine 518, an output engine 520, and/or one or more additional or alternative computing device engines (not depicted). Additionally or alternatively, client device 502 and/or computing device 512 can be associated with agricultural image data 522 and/or one or more additional or alternative components (not depicted).

The user interface input device(s) 510 may include, for example, a physical keyboard, a touch screen (e.g., implementing a virtual keyboard or other textual input mechanism), a microphone, and/or a camera. Similarly, the user interface output device(s) 510 may include, for example, a display screen and/or speaker(s). The user interface input/output device(s) 510 may be incorporated with client device 502 of a user. For example, a mobile phone of the user may include the user interface input/output devices 510; or a first computing device may include the user interface input device(s) 510 and a separate computing device may include the user interface output device(s) 510; etc.

Although client device 502 is illustrated in FIG. 5 as separate from the user interface input/output device(s) 510, in some implementations, all or aspects of the computing system may be implemented on a client device that also contains the user interface input/output device(s) 510. Some non-limiting examples of client device 502 and/or computing device 512 that may one or more of: a desktop computing device, a laptop computing device, a standalone hardware device at least in part dedicated to an automated assistant, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided.

Client device 502 and/or computing device 512 may include one or more memories for storage of data and software applications, one or more processors for accessing data and executing applications, and other components that facilitate communication over a network. The operations performed by client device 502 and/or computing device 512 may be distributed across multiple computing devices. For example, computing programs running on one or more computers in one or more locations can be coupled to each other through a network.

In some implementations, agricultural image data 522 can include one or more instances of agricultural image data captured from above one or more fields. In some implementations, the instances of image data can be captured via one or more image sensors affixed to one or more satellites, one or more cube satellite, one or more airplanes, one or more helicopters, one or more unmanned aerial vehicles, one or more additional or alternative objects orbiting earth, one or more additional or alternative aircraft, and/or combinations thereof. In some implementations, the image sensors may include one or more digital cameras, one or more video cameras, one or more thermal imaging sensors, one or more light detection and ranging ("LIDAR") sensors, one or more additional or alternative imaging sensors, and/or combinations thereof. Additionally or alternatively, the instances of agricultural image data can include a variety of additional information such as (but not limited to), the date the image data was captured, the time the image data was captured, the location of the image data, the location of the image sensor(s) when the image data was captured, the altitude of the image sensor(s) when the image data was captured, etc. In some implementations, the location of the image data and/or the location of the image sensor(s) can be captured via a satellite navigation system (e.g., GPS, GLONASS, GALILEO, BeiDou, etc.), can be captured via one or more additional or alternative location sensors, can be determined based on processing the instance of image data, via one or more additional or alternative methods, and/or combinations thereof.

In some implementations, client device user function engine 504 can be used to identify a user defined function. For example, a user of the client device 502 can generate the user defined function via one or more user interface input devices 510 (e.g., a keyboard). In some implementations, the user of the client device 502 can generate a given user defined function in an application programming interface (API). In some of those implementations, the user can define the given user defined function in the API via a variety of programming languages such as, but not limited to, Python, C, C++, Java, one or more additional or alternative programming languages, and/or combinations thereof. Additionally or alternatively, client device user function engine 508 can transmit the user defined function to the computing device 512. In some implementations, client device user function engine 504 can transmit one or more instances of agricultural image data 522 along with the user defined function to the computing device 512. Additionally or alternatively, the user defined function can include a reference to one or more instances of agricultural image data 522 previously transferred to computing device 512.

Computing device user function engine 514 can identify a user defined function transmitted from the client device 502. For example, computing device user function engine 514 can identify a given user defined function transmitted to the computing device 512 via the client device user function engine 504 of client device 502.

In some implementations, instruction sequence engine 516 can process a given user defined function to generate a sequence of instructions to generate the agricultural image data aggregation and/or joining indicated by the user defined function. In some of those implementations, the sequence of instructions can be a directed acyclic graph. In some implementations, instruction sequence engine 516 can process the given user defined function to generate the sequence of instructions in accordance with process 700 described herein with respect to FIG. 7.

Operation queue engine 518 can be used to add generated instruction(s) to an operations queue (e.g., to add instructions generated using instruction sequence engine 516 to the operations queue). In some implementations, operation queue engine 518 can add instructions from multiple user defined functions to the same operations queue. In some of those implementations, operations queue engine 518 can determine whether any instructions from a first user defined function are repeated in a second user defined function. In response to determining one or more instructions are repeated in the operations queue, the system can use the processing of the repeated one or more instructions for both the first user defined function and the second user defined function.

Additionally or alternatively, operation queue engine 518 can schedule the processing of one or more instructions in the operations queue. In some implementations, the instructions can be processed in batches. Additionally or alternatively, the instructions can be processed in real time (or near real time) as they are added to the operations queue.

Furthermore, operation queue engine 518 can determine whether all the instructions corresponding to a given user defined function have been processed from the operations queue.

Output engine 520 can determine whether all the instructions corresponding to a given user defined function have been processed from the operations queue. In some implementations, in response to determining all the instructions corresponding to a given user defined function have been processed, output engine 520 can generate output responsive to the user defined function. Additionally or alternatively, output engine 520 can transmit the output responsive to the user defined function to client device 502.

Storage engine 506 can store generated output responsive to a user defined function. In some implementations, the storage engine 506 can store the output responsive to the user defined function locally at client device 502. In some other implementations, the storage engine can store the output responsive to the user defined function at a computing device remote from client device 502.

In some implementations, display engine 508 can render image data based on the output responsive to the user defined function. For example, the display engine 508 can render image data via one or more display devices of user interface output devices 510.

Figure 6:
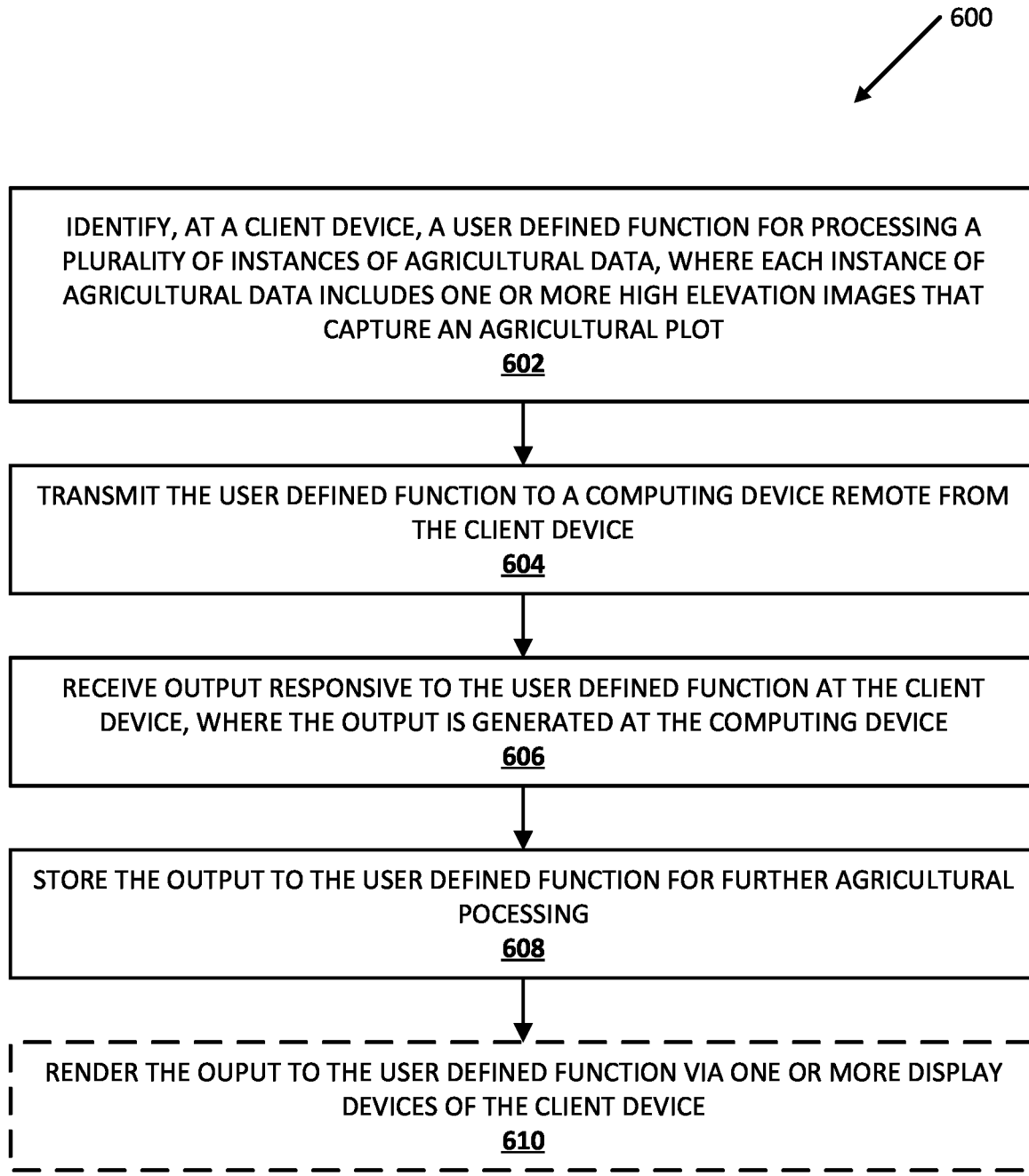
FIG. 6 is a flowchart illustrating an example process in accordance with various implementations disclosed herein.

FIG. 6 is a flowchart illustrating an example process 600 of receiving, at a client device, output responsive to a user defined function in accordance with implementations disclosed herein. For convenience, the operations of the flowchart are described with reference to a system that performs the operations. This system may include various components of various computer systems, such as one or more components of computing system 502, and/or computing system 910. Moreover, while operations of process 600 are shown in a particular order, this is not meant to be limiting. One or more operations may be reordered, omitted, and/or added.

At block 602, the system identifies, at a client device, a user defined function for processing a plurality of instances of agricultural data. In some implementations, each instance of agricultural data includes one or more high elevation images that capture an agricultural plot. In some implementations, the user defined function can identify the plurality of instances of agricultural data. Additionally or alternatively, the user defined function can indicate how to aggregate and/or join one or more instances of agricultural data of the plurality of instances of agricultural data.

In some implementations, a user can generate a given user defined function in an application programming interface (API). In some of those implementations, the user can define the given user defined function in the API via a variety of programming languages such as, but not limited to, Python, C, C++, Java, one or more additional or alternative programming languages, and/or combinations thereof.

Each instance of agricultural data, in the plurality of instances of agricultural data, can include one or more high elevation images that capture an agricultural plot. In some implementations, the one or more high elevation images can be captured via image sensor(s) affixed to one or more satellites, one or more cube satellite, one or more airplanes, one or more helicopters, one or more unmanned aerial vehicles, one or more additional or alternative objects orbiting earth, one or more additional or alternative aircraft, and/or combinations thereof. In some implementations, the image sensors may include one or more digital cameras, one or more video cameras, one or more thermal imaging sensors, one or more light detection and ranging ("LIDAR") sensors, one or more additional or alternative imaging sensors, and/or combinations thereof.

Each instance of agricultural data can additionally include a geo-location, a temporal value, metadata indicating one or more crops planted in the corresponding agricultural plot, one or more additional or alternative values, and/or combinations thereof. The geo-location data can indicate the location of the agricultural plot captured in a given instance of agricultural data and/or the location of the image sensor capturing the image data of the given instance of agricultural data. For example, the location of the image data and/or the location of the image sensor(s) can be captured via a satellite navigation system (e.g., GPS, GLONASS, GALILEO, BeiDou, etc.), can be captured via one more additional or alternative location sensors, can be determined based on processing the given instance of image data, via one or more additional or alternative methods, and/or combinations thereof.

The temporal value can capture the date, the time, one or more additional or alternative values, and/or combinations thereof corresponding to when the image data was captured. For example, the system can capture images of the same agricultural plot (e.g., the same geo-location data) at different times in the same day, on different dates, in different years, etc. In some implementations, further agricultural processing can be performed on instances of agricultural data capturing the same location (e.g., the same agricultural plot) on different dates, such as generating a predicted crop yield, generating an estimated rainfall, additional or alternative agricultural processing, and/or combinations thereof.

For example, the system can process a given instance of agricultural data to generate a representation of the given instance that includes one or more portions represented by raster data and one or more portions represented by vector data. In some implementations, the system can identify a contiguous group of cells indicating corn is planted in each of the cells in the contiguous group. In some implementations, the system can generate a vector data representation of the contiguous group of cells. The vector data representation of the agricultural image data can represent portion(s) of the image data as a combination one or more geometric shapes (e.g., point(s), line(s), curve(s), polygon(s), one or more additional or alternative shapes, and/or combinations thereof).

Additionally or alternatively, the vector data representation of the contiguous group of cells can be a more compact representation of the given image data. In other words, by replacing one or more portions of the given instance of agricultural data with vector data representation(s), the revised instance of image data takes fewer computing resources to store and/or process. For instance, processing the area captured by the vector data representation can be performed with a single operation, such as by processing the value indicated by the corresponding contiguous group of cells. In contrast, to process the equivalent portion of the image data using the raster representation, the system would need to perform one operation for each cell in the contiguous group of cells.

In some implementations, the vector data portion of an instance of agricultural data can be indexed in a data structure, such as an R-tree. Additionally or alternatively, a raster data portion of the given instance of agricultural data can be indexed as a tile map (also referred to as a tiled web map, slippy tiles, etc.). A tile map can be used to join multiple individually requested image files in a single large image. For example, a tile map can be used to join multiple instances of agricultural data capturing a given field. In some implementations, a user viewing the tile map representation of the agricultural data can navigate to nearby areas. As the user pans to new locations, most of the displayed tiles are still relevant and can be kept displayed while the new tiles are fetched.

In some implementations, a given user defined function can aggregate and/or join the plurality of instances of agricultural data. As an illustrative example, a user defined function can identify a first set of agricultural image data capturing a given farm on a first date, and a second set of agricultural image data capturing the given farm on a second date. The user defined function can provide instructions to generate a first normalized difference vegetation index (NDVI) based on processing the first set of agricultural image data, a second NDVI based on processing the second set of agricultural image data, and output based on comparing the first NDVI and the second NDVI.

At block 604, the system transmits the user defined function to a computing device, where the computing device is remote from the client device. In some implementations, the system can additionally transmit one or more instances of the agricultural data along with the user defined function. Additionally or alternatively, the user defined function can identify one or more instances of agricultural data for processing with the user defined function, where the one or more instances of agricultural data can be stored locally at the client device, locally at the computing device, remote from the client device and the computing device, etc. In some of those implementations, the one or more instances of agricultural data were previously transferred to the third party by the user along with a previous user defined function. In some other implementations, the one or more instances of agricultural data were previously transmitted to the third party by an additional user not affiliated with the user who generated the user defined function. For example, the system can transmit the user defined function from client device 502 to computing device 512 described with respect to FIG. 5.

At block 606, the system receives, at the client device, output responsive to the user defined function. In some implementations, the output responsive to the user defined function is generated at a computing device (e.g., computing device 512 of FIG. 5) that is remote from the client device (e.g., client device 502 of FIG. 5). In some implementations, the output responsive to the user defined function is generated in accordance with process 700 described herein with respect to FIG. 7.

In continuation of the illustrated example from block 602, the system can receive output responsive to the user defined function, where the user defined function provides instructions to generate a first NDVI, a second NDVI, and output based on comparing the first NDVI and the second NDVI. Additionally or alternatively, the output responsive to the user defined function can include output generated at one or more intermediate steps during the processing of the user defined function. For instance, the output responsive to the user defined function can include the first NDVI and/or the second NDVI in addition to the output generated based on comparing the first NDVI and the second NDVI.

At block 608, the system stores the output of the user defined function for further agricultural processing. In some implementations, the system can store the output to the user defined function locally at the client device and/or at an additional computing device remote from the client device. For example, the system can store the output to the user defined function such that the output can be utilized in additional or alternative agricultural data processing, such as one or more training instances for training a machine learning model (e.g., a crop yield prediction model, a fertilizer model, a planting date model, a harvesting date model, etc.).

At block 610, the system optionally renders the output to the user defined function via one or more display devices of the client device. In some implementations, the system can render image data based on the output. For example, the system can render a vegetation index generated based on aggregating agricultural data and/or joining agricultural data based on the user defined function.

Figure 7:
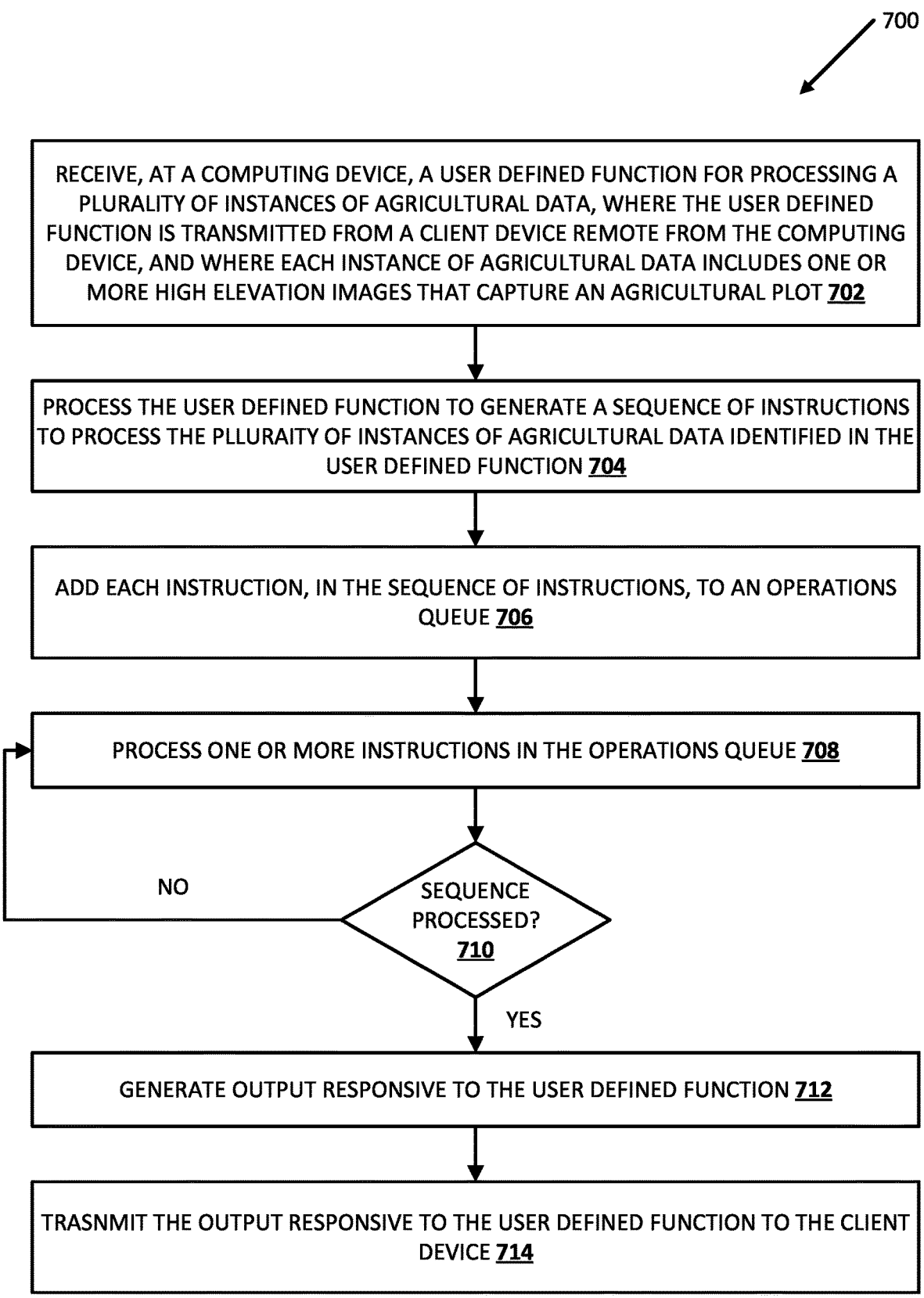
FIG. 7 is a flowchart illustrating another example process in accordance with various implementations disclosed herein.

FIG. 7 is a flowchart illustrating an example process 700 of generating, at a computing system, output responsive to a user defined function in accordance with implementations disclosed herein. For convenience, the operations of the flowchart are described with reference to a system that performs the operations. This system may include various components of various computer systems, such as one or more components of computing system 502, and/or computing system 910. Moreover, while operations of process 700 are shown in a particular order, this is not meant to be limiting. One or more operations may be reordered, omitted, and/or added.

At block 702, the system receives, at a computing device, a user defined function for processing a plurality of instances of agricultural data. In some implementations, the user defined function is transmitted from a client device remote from the computing device. For example, the user defined function can be generated in accordance with block 602 and transmitted in accordance with block 604 of process 600 described herein with respect to FIG. 6.

At block 704, the system processes the user defined function to generate a sequence of instructions to process the plurality of instances of agricultural data identified in the user defined function. In some implementations, the sequence of instructions can be one or more steps to aggregate and/or join the instances of agricultural data based on the user defined function. In some of those implementations, the sequence of instructions generated by the system can be a directed acyclic graph. The directed acyclic graph can include a set of vertices connected by one or more edges. The path, represented by one or more edges, between any two vertices will never form a closed loop.

Figure 8:
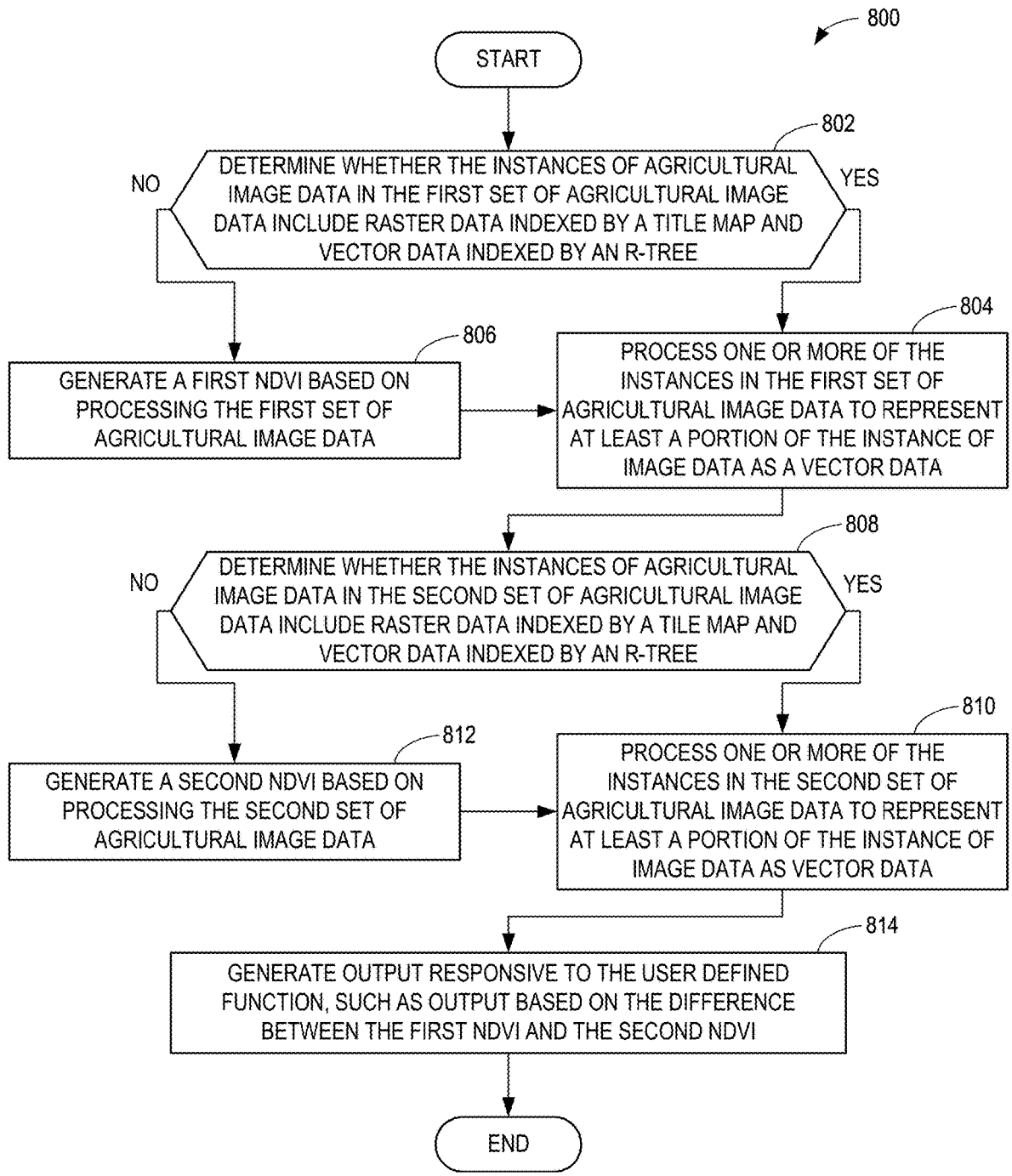
FIG. 8 illustrates an example sequence of instructions in accordance with various implementations disclosed herein.

For example, the system can receive the example user defined function described herein with respect to process 600 of FIG. 6, where the user defined function identifies a first set of agricultural image data capturing a given farm on a first date, a second set of agricultural image data capturing the given farm on a second date, as well as instructions to generate a first NDVI based on processing the first set of agricultural image data, a second NDVI based on processing the second set of agricultural image data, an output based on comparing the first NDVI and the second NDVI. In some implementations, the system can generate a sequence of instructions based on the user defined function. For example, the system can generate the sequence of instructions 800 as illustrated in FIG. 8 based on the illustrative user defined function. The sequence of instructions 800 includes instructions A (802) to G (814).

Instruction A (802) can include determining whether the instances of agricultural image data in the first set of agricultural image data include raster data indexed by a tile map and vector data indexed by a R-tree. If, based on instruction A (802), the system determines the instances of agricultural image data in the first set of agricultural image data including both raster data and vector data, the system can proceed to instruction B (804). If, based on instruction A (802), the system determines, the first set of agricultural image data does not include raster data and vector data, the system can proceed to instruction C (806) and process one or more of the instances in the first set of agricultural image data to represent at least a portion of the instance of image data as vector data as described herein. Subsequent to processing the first set of agricultural image data using instruction C (806), the system can proceed to instruction B (804).

At instruction B (804), the system can generate a first NDVI based on processing the first set of agricultural image data. Additionally or alternatively, the system can proceed from instruction B (804) to instruction D (808). Instruction D (808) can include determining whether the instances of agricultural image data in the second set of agricultural image data include raster data indexed by a tile map and vector data indexed by an R-tree.

If, based on instruction D (808), the system determines the instances of agricultural image data in the second set of agricultural image data includes both raster data and vector data, the system can proceed to instruction E (810). If, based on instruction D (808), the system determines, the second set of agricultural image data does not include raster data and vector data, the system can proceed to instruction F (812) and process one or more of the instances in the second set of agricultural image data to represent at least a portion of the instance of image data as vector data as described herein. Subsequent to processing the second set of agricultural image data using instruction F (812), the system can proceed to instruction E (810).

At instruction E (810), the system can generate a second NDVI based on processing the second set of agricultural image data. Additionally or alternatively, the system can proceed from instruction E (810) to instruction G (814). At instruction G (814), the system can generate output responsive to the user defined function, such as output based on the difference between the first NDVI and the second NDVI. In the illustrated example, instruction sequence 800 is a directed acyclic graph. In other words, the sequence can proceed from start to finish with no directed cycles (e.g., each edge directed from one vertex to another vertex will never form a closed loop).

At block 706, the system adds each instruction, in the sequence of instructions to an operations queue. For example, the system can add instructions A (802), B (804), C (806), D (808), E (810), F (812), and G (814) as described here with respect to FIG. 8 to the operations queue.

At block 708, the system processes one or more instructions in the operations queue. In some implementations, the system can process one or more of the instructions in the operations queue as a batch. Additionally or alternatively, the system can process one or more instructions in the operations queue in real time (or near real time) as the instructions are added to the queue.

In some implementations, instructions corresponding to two or more user defined functions can be present in the operations queue. In some of those implementations, one or more instructions of a first user defined function can also be included in a second user defined function. For example, the user defined function 800 illustrated in FIG. 8 includes instruction C (806) of processing a first set of agricultural image data to represent at least a portion of each instance of image data as vector data as described herein. An additional user defined function can also provide the instruction of processing the first set of agricultural image data to represent portion(s) as vector data. In other words, two user defined functions can both include an instruction to process the same set of agricultural image data in the same way. In some of those implementations, the system can use the output generated by processing instruction C (806) in processing additional instructions of both the user defined function 800 and the additional user defined function. In other words, the system can review instructions in the operations queue such that instructions are not unnecessarily repeated, thus conserving computing resources.

At block 710, the system determines whether each of the instructions, in the sequence of instructions corresponding to the user defined function has been processed. If the system determines each of the instructions in the sequence of instructions corresponding to the user defined function has not been function, the system returns back to block 708 and processes one or more additional instructions in the operations queue. If the system determines that each instruction in the sequence of instructions corresponding to the user defined function has been processed, the system proceeds to block 712.

For example, the system can determine whether instructions A (802) through G (814) of user defined function 800 have been processed. If the system determines one or more of the instructions have not been processed (e.g., instruction G (814) has not been processed, instructions E (810) and G (814) have not been processed, etc.), the system can proceed back to block 708 and process one or more additional instructions in the operations queue. Additionally or alternatively, if the system determines instructions A (802) through G (814) of user defined function 800 have been processed, the system can proceed to block 712.

At block 712, the system generates output responsive to the user defined function. The system can generate a variety of output directed towards agricultural data aggregation and/or agricultural data joining, such as but not limited to, one or more vegetation indices, one or more training instances for a machine learning model, a trained machine learning model, a comparison of predicted values for farms across a region, a country, etc., one or more additional or alternative outputs, and/or combinations thereof.

For instance, the user defined function 800 described with respect to FIG. 8 herein can generate responsive output based on comparing the first NDVI and the second NDVI. In some implementations, the output can be image data illustrating differences between the first NDVI and the second NDVI. Additionally or alternatively, the output can include the first NDVI and/or the second NDVI itself. In other words, the output responsive to a user defined function can include intermediate data aggregation and/or joining steps in addition to the overall output generated based on the user defined function.

At block 714, the system transmits the output responsive to the user defined function to the client device. For example, the system can transmit the output responsive to the user defined function from computing system 512 to client device 502 described with respect to FIG. 5. Additionally or alternatively, the system can transmit the output responsive to the user defined function, where the output responsive to the user defined function is received by the client device in accordance with block 606 of process 600.

Figure 9:
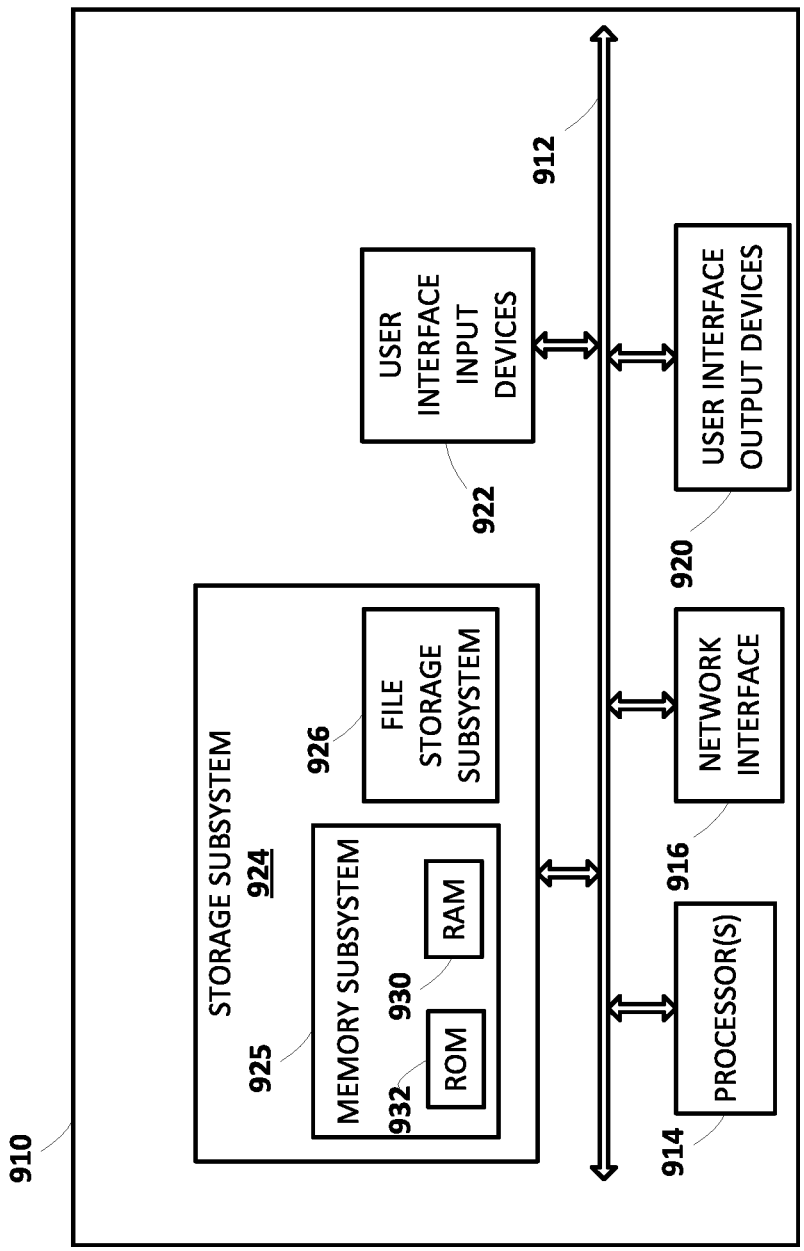
FIG. 9 illustrates an example architecture of a computing device.

FIG. 9 is a block diagram of an example computing device 910 that may optionally be utilized to perform one or more aspects of techniques described herein. In some implementations, one or more of a client computing device, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the processes of FIG. 6 and/or FIG. 7, as well as to implement various components depicted in FIG. 5.

These software modules are generally executed by processor 914 alone or in combination with other processors. Memory 925 used in the storage subsystem 924 can include a number of memories including a main random access memory ("RAM") 930 for storage of instructions and data during program execution and a read only memory ("ROM") 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple buses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors includes identifying, at a client device, a user defined function for processing a plurality of instances of agricultural data, wherein each instance of agricultural data in the plurality of instances of agricultural data includes one or more high elevation images that capture an agricultural plot, wherein each instance of the agricultural data includes a geo-location, a temporal value, and metadata indicating one or more crops planted in the agricultural plot, wherein each instance of the agricultural data is divided into a plurality of cells representing one or more respective categories of agricultural data captured in the agricultural plot, and wherein at least one portion of the plurality of cells is represented in the instance of agricultural data as vector data that explicitly identifies the boundaries of a contiguous grouping of cells representing the same category of agricultural data. The method further includes transmitting the user defined function to a computing device remote from the client device. The method further includes receiving output responsive to the user defined function at the client device, wherein the output responsive to the user defined function is generated at the computing device. The method further includes storing the output responsive to the user defined function for further agricultural processing.

These and other implementations of the technology disclosed herein can include one or more of the following features.

In some implementations, the one or more respective categories of agricultural data are identified in the metadata portion of the instance of agricultural data.

In some implementations, the user defined function for processing the plurality of instances of agricultural data is generated by a user of a third party application programming interface. In some versions of those implementations, the output responsive to the user defined function includes aggregation and/or joining of one or more of the instances of agricultural data in the plurality of instances of agricultural data. In some versions of those implementations, the method further includes rendering the output responsive to the user defined function via a browser of one or more display devices of the client device.

In some implementations, generating output responsive to the user defined function includes generating a sequence of instructions to process the plurality of instances of agricultural data identified in the user defined function. In some implementations, the method further includes adding each instruction in the sequence of instructions to an operations queue managed by the third party. In some implementations, the method further includes processing one or more instructions in the operations queue. In some implementations, the method further includes determining whether each instruction in the sequence of instructions has been processed. In some implementations, in response to determining whether each instruction in the sequence of instructions has been processed, the method further includes generating the output responsive to the user defined function. In some versions of those implementations, generating the sequence of instructions to process the plurality of instances of agricultural data identified in the user defined function comprises generating a directed acyclic graph to perform the user defined function. In some versions of those implementations, processing the one or more instructions in the operations queue includes identifying a batch of instructions in the operations queue. In some implementations, the method further includes processing the identified batch of instructions. In some versions of those implementations, processing the one or more instructions in the operations queue comprises processing the one or more instructions in real time as they are added to the operations queue.

In some implementations, the user defined function for processing the plurality of instances of agricultural data includes generating an enhanced vegetation index based on processing the plurality of instances of agricultural data. In some versions of those implementations, the method further includes identifying an additional user defined function for processing the plurality of instances of agricultural data, wherein the additional user defined function includes generating a normalized difference vegetation index based on processing the plurality of instances of agricultural data. In some implementations, the method further includes transmitting the additional user defined function to the computing device. In some implementations, the method further includes receiving additional output response to the additional user defined function, wherein the additional output is generated at the computing device. In some implementations, the method further includes storing the additional output responsive to the additional user defined function for further agricultural processing.

In some implementations, a method implemented by one or more processors is provided, the method includes receiving, at a computing device, a user defined function for processing a plurality of instances agricultural data, wherein the user defined function is transmitted from a client device remote from the computing device, wherein each instance of agricultural data in the plurality of instances of agricultural data includes one or more high elevation images that capture an agricultural plot, wherein each instance of the agricultural data includes a geo-location, a temporal value, and metadata indicating one or more crops planted in the agricultural plot, wherein each instance of the agricultural data is divided into a plurality of cells representing one or more respective categories of agricultural data captured in the agricultural plot, and wherein at least one portion of the plurality of cells is represented in the instance of agricultural data as vector data that explicitly identifies the boundaries of a contiguous grouping of cells representing the same category of agricultural data. In some implementations, the method further includes processing the user defined function to generate a sequence of instructions to process the plurality of instances of agricultural data identified in the user defined function. In some implementations, the method further includes adding each instruction in the sequence of instructions to an operations queue. In some implementations, the method further includes processing one or more instructions in the operations queue. In some implementations, the method further includes determining whether each instruction in the sequence of instructions has been processed. In some implementations, in response to determining whether each instruction in the sequence of instructions has been processed, the method further includes generating the output responsive to the user defined function. In some implementations, the method further includes transmitting the output responsive to the user defined function to the client device.

These and other implementations of the technology disclosed herein can include one or more of the following features.

In some implementations, the plurality of instances of agricultural data are stored locally at the computing device.

In some implementations, the plurality of instances of agricultural data are stored at a further computing device, wherein the further computing device is remote from the computing device.

In some implementations, processing the one or more instructions in the operations queue includes identifying a batch of instructions in the operations queue. In some implementations, the method further includes processing the identified batch of instructions.

In some implementations, processing the one or more instructions in the operations queue comprises processing the one or more instructions in real time as they are added to the operations queue.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:

identifying a first user-defined function for processing a first set of agricultural data, wherein the first set of agricultural data includes a high elevation image that includes an agricultural plot, a geo-location, a temporal value, and metadata indicating one or more crops planted in the agricultural plot, and wherein the high elevation image is divided into a plurality of cells representing one or more categories of the first set of agricultural data in the agricultural plot, wherein the first user-defined function for processing the first set of agricultural data includes generating a first index (NDVI) based on processing a plurality of instances of the first set of agricultural data, the first NDVI is a spectral imaging transformation of two or more image bands;

determining at least one portion of the plurality of cells of the high elevation image as a contiguous grouping of cells representing the same category of the agricultural data based on whether the plurality of cells exceed a threshold number of cells;

generating a boundary around the contiguous grouping of cells, wherein the first set of agricultural data of the contiguous grouping of cells is represented as first vector data and the first set of agricultural data not within the contiguous grouping of cells is represented as first raster data, wherein the first vector data represents a geometric representation of the group of cells along with the category of the group of cells;

generating a first output responsive to the first user-defined function based on the first set of agricultural data, wherein the first output includes an aggregated and/or joined agricultural data;

generating a subsequent output responsive to a second user-defined function for processing a second set of agricultural data, wherein the second set of agricultural data includes second raster data and second vector data, the second vector data indicates an unplanted portion of the agricultural plot, wherein the second user-defined function for processing the second set of agricultural data includes a second NDVI based on processing the second set of agricultural data; and transmitting a difference between the first output and the subsequent output locally to a client device, wherein difference between the first output and the subsequent output is comparing the first NDVI and the second NDVI.

2. The method of claim 1, wherein the one or more categories of the first set of agricultural data are identified in the metadata of the first set of agricultural data.

3. The method of claim 1, wherein the first user-defined function for processing the first set of agricultural data is generated by a user of a third party application programming interface.

4. The method of claim 3, wherein the first output responsive to the first user-defined function includes aggregation and/or joining of one or more of an instance of the first set of agricultural data in a plurality of instances of the first set of agricultural data.

5. The method of claim 4, further including rendering the first output responsive to the first user-defined function via a browser of one or more display devices of the client device.

6. The method of claim 3, wherein generating the first output responsive to the first user-defined function includes:

generating a sequence of instructions to process the first set of agricultural data identified in the first user-defined function;

adding each instruction in the sequence of instructions to an operations queue managed by a third party;

processing one or more instructions in the operations queue;

determining whether each instruction in the sequence of instructions has been processed; and in response to determining each instruction in the sequence of instructions has been processed, generating the first output responsive to the first user-defined function.

7. The method of claim 6, wherein generating the sequence of instructions to process the first set of agricultural data identified in the first user-defined function includes generating a directed acyclic graph to perform the first user-defined function.

8. The method of claim 6, wherein processing the one or more instructions in the operations queue includes:

identifying a batch of instructions in the operations queue; and processing the identified batch of instructions.

9. The method of claim 6, wherein processing the one or more instructions in the operations queue includes processing the one or more instructions in real time as added to the operations queue.

10. The method of claim 1, including transmitting to the client device instructions to implement the second set of agricultural data in the agricultural plot based on the difference.

11. A system comprising a processor having access to memory media storing instructions executable by the processor to perform operations, comprising:

identifying a first user-defined function for processing a first set of agricultural data, wherein the first set of agricultural data includes a high elevation image that includes an agricultural plot, a geo-location, a temporal value, and metadata indicating one or more crops planted in the agricultural plot, and wherein the high elevation image is divided into a plurality of cells representing one or more categories of the first set of agricultural data in the agricultural plot, wherein the first user-defined function for processing the first set of agricultural data includes generating a first enhanced vegetation index (NDVI) based on processing a plurality of instances of the first set of agricultural data, the first NDVI is a spectral imaging transformation of two or more image bands;

determining at least one portion of the plurality of cells of the high elevation image as a contiguous grouping of cells representing the same category of the first set of agricultural data based on whether the plurality of cells exceed a threshold number of cells;

generating a boundary around the contiguous grouping of cells, wherein the first set of agricultural data of the contiguous grouping of cells is represented as first vector data and the first set of agricultural data not within the contiguous grouping of cells is represented as first raster data, wherein the first vector data represents a geometric representation of the group of cells along with the category of the group of cells;

generating a first output responsive to the first user-defined function based on the first set of agricultural data, wherein the first output includes an aggregated and/or joined agricultural data;

generating a subsequent output responsive to a second user-defined function for processing a second set of agricultural data, wherein the second set of agricultural data includes second raster data and second vector data, the second vector data indicates an unplanted portion of the agricultural plot, wherein the second user-defined function for processing the second set of agricultural data includes a second NDVI based on processing the second set of agricultural data; and transmitting a difference between the first output and the subsequent output locally to a client device, wherein difference between the first output and the subsequent output is comparing the first NDVI and the second NDVI.

12. The system of claim 11, wherein the first set of agricultural data is stored locally at the client device.

13. The system of claim 12, wherein the second set of agricultural data is stored at a further computing device, wherein the further computing device is remote from the client device.

14. The system of claim 11, further including processing the one or more instructions in an operations queue, and wherein processing the one or more instructions in the operations queue includes:
   identifying a batch of instructions in the operations queue; and
   processing the identified batch of instructions.

15. The system of claim 14, wherein processing the one or more instructions in the operations queue further includes processing the one or more instructions in real time as added to the operations queue.

16. A non-transitory computer readable storage medium configured to store instructions that, when executed by one or more processors, cause the one or more processors to:
   identify a first user-defined function for processing a first set of agricultural data, wherein the first set of agricultural data includes a high elevation image that includes an agricultural plot, a geo-location, a temporal value, and metadata indicating one or more crops planted in the agricultural plot, and wherein the high elevation image is divided into a plurality of cells representing one or more categories of the first set of agricultural data in the agricultural plot, wherein the first user-defined function for processing the first set of agricultural data includes generating a first NDVI based on processing a plurality of instances of the first set of agricultural data, the first NDVI is a spectral imaging transformation of two or more image bands;
   determine at least one portion of the plurality of cells of the high elevation image as a contiguous grouping of cells representing the same category of the first set of agricultural data based on whether the plurality of cells exceed a threshold number of cells;
   generate a boundary around the contiguous grouping of cells, wherein the first set of agricultural data of the contiguous grouping of cells is represented as first vector data and the first set of agricultural data not within the contiguous grouping of cells is represented as first raster data, wherein the first vector data represents a geometric representation of the group of cells along with the category of the group of cells;
   generate a first output responsive to the first user-defined function based on the first set of agricultural data, wherein the first output includes an aggregated and/or joined agricultural data;
   generate a subsequent output responsive to a second user-defined function for processing a second set of agricultural data, wherein the second agricultural data includes second raster data and second vector data, the second vector data indicates an unplanted portion of the agricultural plot, wherein the second user-defined function for processing the second set of agricultural data includes a second NDVI based on processing the second set of agricultural data; and
   transmit a difference between the first output and the subsequent output locally to a client device, wherein difference between the first output and the subsequent output is comparing the first NDVI and the NDVI.

17. The non-transitory computer readable storage medium of claim 16, wherein the one or more categories of the first set of agricultural data are identified in the metadata of the first set of agricultural data.

18. The non-transitory computer readable storage medium of claim 16, wherein the first user-defined function for processing the first set of agricultural data is generated by a user of a third party application programming interface.

19. The non-transitory computer readable storage medium of claim 18, wherein the first output responsive to the first user-defined function includes aggregation and/or joining of one or more instances of the first set of agricultural data in a plurality of instances of the first set of agricultural data.

* * * * *